Patented Jan. 8, 1952

2,581,626

UNITED STATES PATENT OFFICE 2,581,626

THIENYLTHIO CARBOXYLIC ACIDS AND THIENYLTHIO CARBOXYLIC ACID ESTERS IN LUBRICATING COMPOSITIONS

John W. Brooks, Wenonah, N. J., assignor to Socony-Vacuum Oil Company, Incorporated, a corporation of New York No Drawing. Application October 6, 1948, Serial No. 53,155

8 Claims. (Cl. 252—48.6)

This invention relates to a group of new chemical compounds, namely, the thienylthio substituted carboxylic acids and esters thereof. More specifically, the present invention is directed to an improvement of various mineral oil fractions normally susceptible to the deleterious effects of oxidation by incorporation therein of a minor proportion of one or more of the aforesaid compounds in an amount sufficient to stabilize the oil against oxidation.

As is well known to those familiar with the art, substantially all of the numerous fractions obtained from mineral oils and refined for their various uses are susceptible to oxidation. The susceptibility of an oil fraction to oxidation and the manner in which oxidation manifests itself within the oil varies with the type and degree of refinement to which the oil has been subjected and with the conditions under which it is used or tested; that is, the products formed in an oil fraction as a result of oxidation and the degree to which they are formed depend on the extent to which the various unstable constituents, or constituents which may act as oxidation catalysts, have been removed by refining operations and also upon the conditions of use.

The present invention is predicated upon the discovery that a group of new chemical compounds, the thienylthio substituted carboxylic acids and esters thereof, greatly improve the oxidation characteristics of mineral oil fractions by incorporation therein of minor proportions of these compounds. It has been found that by the addition of a thienylthio substituted carboxylic acid or ester thereof to a viscous mineral oil fraction, the development of undesirable products and properties such as acid, sludge, discoloration and corrosiveness toward alloy-bearing metals, normally encountered under conditions of use, has been substantially inhibited.

The compounds of this invention may be designated by the general formula:

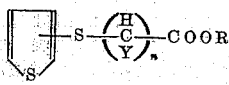

where R is hydrogen or an alkyl group; Y is hydrogen, an alkyl, an acyl or a carboxy group; and $n$ is a whole number from 1 to 18.

The thiosulfur linkages of the above compounds may be attached to either the 2-position or the 3-position of the thiophene ring. In the former instance, the compound will be a 2-thienylthio substituted carboxylic acid or ester and in the latter instance, a 3-thienylthio substituted carboxylic acid or ester. It is also contemplated that the thiophene ring may have one or more of its nuclear hydrogen atoms replaced by other substituent groups such as alkyl, alkoxy, aryl, alicyclic, aralkyl, halogen and the like.

The thienylthio substituted carboxylic acids may suitably be prepared by the reaction of a thiophenethiol with a halogen substituted carboxylic acid. Under such conditions the hydrogen of the mercapto group in the thiophenethiol reacts with the halogen of the halo acid to split out hydrogen halide. The reaction is preferably carried out in the presence of alkali so that the resulting compound is the sodium salt of the desired acid. The thienylthio substituted acid may readily be obtained upon acidification of the sodium salt. The general reaction may thus be shown by the following general equations:

(1)

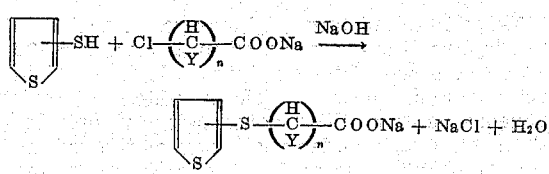

(2)

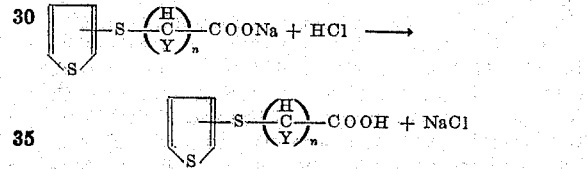

The thienylthio substituted carboxylic acids of this invention may also be prepared by the addition of a thiophenthiol to an unsaturated carboxylic acid. In such reaction the thienylthio group and the hydrogen of the mercapto group readily add across the unsaturated linkage of the organic acid to yield the desired thienylthio substituted carboxylic acid. Where the acid employed is an alpha beta unsaturated acid, the addition reaction takes place even without the aid of an alkylation catalyst. In acids where the unsaturated bond is in a position other than the alpha beta, the addition of thiophenethiol to such a compound requires the use of a catalyst normally used to promote alkylation such as boron trifluoride, silica-alumina composites, and the like. A representative reaction showing the addition of a thiophenethiol to an unsaturated carboxylic acid may be illustrated by the following general equation:

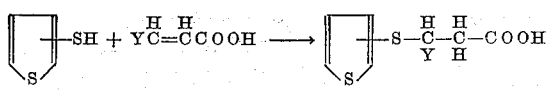

The compounds of this invention may also be obtained upon reacting an acid anhydride with a thiophenethiol. This latter method is particularly to be preferred where a thienylthio substituted dicarboxylic acid is desired. Such compounds may be obtained by reacting the anhydride of the dicarboxylic acid with a thiophenethiol. Esters of the above described thienylthio substituted carboxylic acids may readily be obtained upon the reaction of such acids with an alcohol.

Representative of the compounds of this invention are 3-thienylthio acetic acid, alpha(3-thienylthio) propionic acid, alpha(3-thienylthio) butanoic acid, alpha (3-thienylthio) hexanoic acid, 3-thienylthio succinic acid, and 3-thienylthio undecanoic acid, 3-thienylthio glutaric acid, 3-thienylthio sebacic acid, alpha(3-thienylthio) phenylacetic acid and 3-thienylthio phenylpropionic acid.

The above list, of course, is not to be construed as limiting since the present invention contemplates other thienylthio substituted carboxylic acids and esters thereof coming within the scope of the general formula set forth above.

The preparation of the compounds of the present invention may be illustrated by the following examples, which are given by way of illustration and not intended to be a limitation on the scope of the invention.

EXAMPLE 1

Preparation of 3-thienylthio acetic acid

Three hundred forty-eight grams (3 mols) of 3-thiophenethiol were placed in a flask, and 120 grams (3 mols) of sodium hydroxide dissolved in 200 grams of water were slowly added. To this aqueous solution of the sodium salt of thiophenethiol was slowly added a solution of the sodium salt of chloroacetic acid. The latter compound was prepared by adding a solution of 186 grams (1.5 mols) of sodium carbonate in 500 grams of water to 284 grams (3 mols) of monochloroacetic acid in 300 grams of water at a temperature of 10° C. After the above addition was completed, the reaction mixture was stirred at about 70° C. for a period of two hours. At the end of this time, the resulting reaction product was acidified with hydrochloric acid and the water layer was separated from the liquid product. The water layer was extracted with ethyl ether and the ether extract added to the liquid product. The product was dried over magnesium sulfate and the solvent and light boiling material were distilled off. Three hundred eighteen grams of a product identified as 3-thienylthio acetic acid were obtained, representing a yield of 61 per cent. This compound was characterized by a melting point of 51.5–52.5° C. and a sulfur content of 36.78 per cent.

EXAMPLE 2

Preparation of 3-thienylthio succinic acid

To a flask containing 98 grams (1 mol) of maleic anhydride in 700 milliliters of water were added 174 grams (1½ mols) of 3-thiophenethiol at such a rate that the temperature was maintained at about 45° C. The reaction mixture was stirred for ten hours at 80° C. to insure completion of reaction. The water layer was separated from the resulting product. A white solid formed in the product layer and was recrystallized from cyclohexane. This material was identified as 3-thienylthio succinic acid present in 96 per cent yield and characterized by a melting point of 130–131° C. and a sulfur content of 27.38 per cent, the theoretical sulfur content being 27.61 per cent.

EXAMPLE 3

Preparation of mono-lauryl ester of 3-thienylthio succinic acid

One hundred sixteen grams (½ mol) of 3-thienylthio succinic acid, 115 grams (⅝ mol) of laurol alcohol, 200 cc. of toluene, and 2.5 grams of para-toluene sulfonic acid were placed in a flask equipped with a distilling tube receiver. About 11.5 cc. of water were collected in about 15 minutes of refluxing at a pot temperature of 110° C. The mixture was refluxed for six hours to insure completion of reaction. The toluene was distilled off at atmospheric pressure and the remaining product topped to a pot temperature of 160° C. at 0.8 millimeter of mercury. Mono-lauryl ester of 3-thienylthio succinic acid, having a sulfur content of 13.66 per cent, was obtained in a yield of about 91 per cent.

EXAMPLE 4

Preparation of 3-thienylthio undecanoic acid

Equal molar quantities of 3-thiophenethiol and undecylenic acid $[CH_2:CH(CH_2)_8COOH]$ were mixed and allowed to stand at room temperature for several weeks. The resulting solid which formed was distilled off and was recrystallized from cyclohexane. The crystals so obtained were identified as 3-thienylthio undecanoic acid, characterized by a melting point of 84° C. and a sulfur content of 21.95 per cent, the theoretical sulfur content being 21.34 per cent.

The thienylthio substituted carboxylic acids and the esters thereof have been found to be valuable as additives in the stabilization of petroleum oil functions, particularly in inhibiting the development of undesirable products and properties, such as acid, sludge, discoloration, and corrosiveness toward alloy-bearing metals, normally encountered under conditions of use. Thus, it is well known that motor oils, especially those refined by certain solvent extraction methods, are oxidized when subjected to high temperatures to form products that are corrosive to metal bearings. This corrosive action may be quite severe with certain bearings, such as those having the corrosive susceptibility of cadmium-silver alloys, and may cause their failure within a comparatively short time.

The compounds of this invention are particularly effective in the stabilization of transformer oils and technical white oils, which are of a highly refined character and substantially free from unsaturated hydrocarbons and resinous compounds. Oils of this type are commonly made by refining petroleum distillates of the requisite viscosity by treatment with large quantities of sulfuric acid, including fuming sulfuric acid, followed by neutralization and clay filtration or redistillation. So far as the present invention is concerned, however, the method by which the highly refined character is imparted to the oil is unimportant.

The highly refined viscous petroleum oils, although generally stable against oxygen at ordinary temperatures, tend to absorb atmospheric oxygen when heated, particularly when in contact with catalytic metals such as copper. The result of such oxidation is the reduction of acid compounds soluble in the oils. The oils thereby become unsuitable for their adapted purposes and must be purified or replaced.

The effectiveness of the compounds of this invention in stabilizing highly refined mineral oils against the deleterious effects of oxidation may be evaluated not only by actual use of the stabilized oils in transformers and machinery but also by a laboratory test commonly known as the "German Tar Test," which has been found to give results comparable in degree with the results obtained in actual use. In accordance with this method, a sample of 150 grams of oil is maintained at a temperature of 120° C. and oxygen gas is bubbled through it slowly for 70 hours at a rate of 2 liters per hour. The sample is then titrated with alcoholic potash and the neutralization number of the oil thus determined. The neutralization number varies directly with the susceptibility of the oil to acid formation under the conditions of the test.

In the test specifically described herein, the base oil used was a highly refined oil which had been prepared by treating a coastal distillate with 40 pounds of 98 per cent sulfuric acid and 180 pounds of 103 per cent oleum per barrel (400 pounds of oil) followed by a clay percolation. It had a specific gravity of 0.871, a flash point of 310° F. and a Saybolt Universal viscosity of 69 seconds at 100° F. Such an oil containing no additive, when subjected to the aforementioned test, was readily susceptible to oxidation and developed a neutralization number of about 20. The same oil containing a minor proportion of a thienylthio substituted carboxylic acid or ester thereof, when tested, gave an unexpectedly low neutralization number, indicating a non-susceptibility of the stabilized oil toward oxidation. The following data are indicative of the effectiveness of the compounds of this invention in inhibiting the development of acidity in the mineral oil when the same is subjected to the above-described oxidation conditions:

| Compound Added | Per Cent of Compound | Neutralization Number |
|---|---|---|
| None | 0 | 20 |
| 3-Thienylthio acetic acid | 0.1 | 0.2 |
| Mono-lauryl ester of 3-thienylthio succinic acid | 0.1 | 0.2 |
| 3-Thienylthio undecanoic acid | 0.2 | 0.2 |

The corrosive action of motor oil on an automobile rod bearing with and without the compounds of this invention was shown by the following test. The oil used consisted of Pennsylvania neutral and residuum stocks separately refined by means of Chlorex and then blended to give an S. A. E. 20 motor oil with a specific gravity of 0.872, a flash point of 435° F. and a Saybolt Universal viscosity of about 318 seconds at 100° F. The oil was tested by adding a section of a bearing containing a cadmium-silver alloy surface weighing about 6 grams and heating it to 175° C. for 22 hours while a stream of air was bubbled against the surface of the bearing. The loss in weight of the bearing during this treatment measures the amount of corrosion that has taken place. A sample of the oil containing a stabilizing compound of this invention was run at the same time as a sample of a base oil and the loss in weight of the bearing section in the inhibited oil can thus be compared directly with the loss in the uninhibited oil. The results obtained in this test employing minor proportions of the above-described compounds as inhibitors are set forth in the following table:

| Compound Added | Per Cent of Compound | Mg. Wt. Loss |
|---|---|---|
| None | 0 | 20 |
| 3-Thienylthio acetic acid | 0.1 | 0 |
| Mono-lauryl ester of 3-thienylthio succinic acid | 0.1 | 0 |

From the foregoing test results, it will be evident that the thienylthio substituted carboxylic acids of this invention and the esters thereof are effective stabilizing agents for petroleum lubricating oil fractions. The quantity of compound employed as stabilizer to inhibit the undesirable effects of oxidation in the oil may be varied, depending upon the character of the oil and the severity of the conditions to which it is exposed. Ordinarily, the compositions will be added to mineral oil fractions in an amount ranging from about 0.1 to about 5 per cent but may be added in amounts up to 10 per cent by weight in some instances.

It is to be understood that the examples, procedures and oil compositions described above are illustrative only and are not to be construed as limiting the scope of this invention thereto. Thus, in addition to the specific compounds set forth above, other thienylthio substituted carboxylic acids or esters thereof falling within the scope of the above-disclosed general formula may similarly be employed as additives in improving the properties of viscous mineral oil fractions normally subject to deterioration under oxidizing conditions. It is also contemplated that the compounds of this invention may be used in conjunction with other anti-oxidants, pour point depressants, V. I. agents and other additives commonly employed in improving the characteristics of mineral oil fractions.

I claim:

1. An improved mineral oil composition comprising a major proportion of mineral oil and in admixture therewith a minor proportion, less than about 10 per cent by weight but sufficient to stabilize said oil against the deleterious effects of oxidation, of a compound having the general formula:

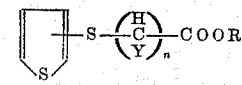

where R is selected from the group consisting of hydrogen and an alkyl group; Y is selected from the group consisting of hydrogen, an alkyl, an acyl, and a carboxy group; and n is a whole number from 1 to 18.

2. An improved mineral oil composition comprising a major proportion of mineral oil and between about 0.1 and about 5 per cent by weight of a compound having the general formula:

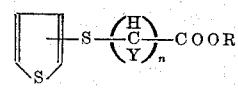

where R is selected from the group consisting of hydrogen and an alkyl group; Y is selected from the group consisting of hydrogen, an alkyl, an acyl, and a carboxy group; and n is a whole number from 1 to 18.

3. An improved mineral oil composition comprising a major proportion of mineral oil and in admixture therewith a minor proportion, less than about 10 per cent by weight but sufficient to stabilize said oil against the deleterious effects of oxidation, of a compound having the formula:

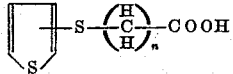

where $n$ is a whole number from 1 to 18.

4. An improved mineral oil composition comprising a major proportion of mineral oil and between about 0.1 and about 5 per cent by weight of a compound having the formula:

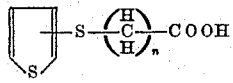

where $n$ is a whole number from 1 to 18.

5. An improved mineral oil composition comprising a major proportion of mineral oil and in admixture therewith a minor proportion, less than about 10 per cent by weight but sufficient to stabilize said oil against the deleterious effects of oxidation, of 3-thienylthio acetic acid.

6. An improved mineral oil composition comprising a major proportion of mineral oil and in admixture therewith a minor proportion, less than about 10 per cent by weight but sufficient to stabilize said oil against the deleterious effects of oxidation, of 3-thienylthio undecanoic acid.

7. An improved mineral oil composition comprising a major proportion of mineral oil and in admixture therewith a minor proportion, less than about 10 per cent by weight but sufficient to stabilize said oil against the deleterious effects of oxidation, of mono-lauryl ester of 3-thienylthio succinic acid.

8. An improved mineral oil composition comprising a major proportion of mineral oil and a minor proportion, less than about 10 per cent by weight but sufficient to stabilize said oil against the deleterious effects of oxidation, of a 3-thienylthio fatty acid.

JOHN W. BROOKS.

REFERENCES CITED

The following references are of record in the file of this patent:

UNITED STATES PATENTS

| Number | Name | Date |
|---|---|---|
| 1,988,501 | Lubb et al. | Jan. 22, 1935 |
| 2,160,293 | Shoemaker et al. | May 30, 1939 |
| 2,321,575 | Clayton | June 15, 1943 |
| 2,438,808 | Avison et al. | Mar. 30, 1948 |
| 2,449,992 | Gresham et al. | Sept. 28, 1948 |
| 2,479,295 | Behrens et al. | Aug. 16, 1949 |
| 2,502,390 | Reiff et al. | Mar. 28, 1950 |
| 2,522,490 | Brooks | Sept. 19, 1950 |